219-121 SR

2/3/87 XR 4,640,382

United States Patent [19]

Hartmann et al.

[11] Patent Number: 4,640,382

[45] Date of Patent: Feb. 3, 1987

[54] ACOUSTIC FRICTIONAL RESISTANCE CONSTRUCTION AND METHOD OF PRODUCING AN ACOUSTIC FRICTIONAL RESISTANCE USING A LASER

[75] Inventors: Hans Hartmann, Vienna; Ewald Kerschbaum, Maria Enzersdorf-Südstadt, both of Austria

[73] Assignee: AKG Akustische u. Kino-Gerate GmbH, Austria

[21] Appl. No.: 644,982

[22] Filed: Aug. 28, 1984

[30] Foreign Application Priority Data

Aug. 29, 1983 [AT] Austria ................................ 3077/83

[51] Int. Cl.[4] ........................ G10K 11/00; B23K 9/00

[52] U.S. Cl. .................................... 181/175; 181/158; 219/121 LK; 219/121 LL; 219/121 LU; 219/121 LY; 381/91; 381/97; 381/155; 381/158

[58] Field of Search ............... 181/157, 158, 286, 175; 219/121 LK, 121 LL, 121 LM, 121 LU, 121 LY; 179/180, 121 D; 381/91, 97; 73/38

[56] References Cited

U.S. PATENT DOCUMENTS

| | | | |
|---|---|---|---|
| 2,656,004 | 10/1953 | Olson | 181/157 X |
| 2,761,912 | 9/1956 | Tougher et al. | 181/166 X |
| 3,419,321 | 12/1968 | Barber et al. | 219/121 LK X |
| 3,734,234 | 5/1973 | Wirt | 181/286 |
| 3,777,079 | 12/1973 | Fischer et al. | 179/121 D |
| 3,930,560 | 1/1976 | Calson et al. | 181/158 X |
| 4,069,401 | 1/1978 | Vogelsinger | 179/180 X |
| 4,281,670 | 8/1981 | Heitmann et al. | 219/121 LK X |
| 4,391,519 | 7/1983 | Kuwabara et al. | 219/121 L UX |
| 4,447,678 | 5/1984 | Fidi | 181/158 X |
| 4,458,134 | 7/1984 | Ogle | 219/121 LL |

FOREIGN PATENT DOCUMENTS

| | | | |
|---|---|---|---|
| 337793 | 7/1977 | Austria . | |
| 0102691 | 8/1979 | Japan | 219/121 LK |
| 0004391 | 1/1981 | Japan | 219/121 LL |
| 670868 | 4/1952 | United Kingdom . | |

OTHER PUBLICATIONS

"Acoustical Engineering", Acoustical Elements, H. F. Olson, D. Van Nostrand Co., Inc., p. 89, 1957.

"Laser & Elektro-Optik", Glas-und Kunstst Offbearbeitung mit Laser $CO_2$-Laser Beam Machining of Plastics and Glass, R. J. Saunders, No. 2, 1975.

*Primary Examiner*—Benjamin R. Fuller

*Attorney, Agent, or Firm*—McGlew and Tuttle

[57] ABSTRACT

Acoustic frictional resistance comprises a plate having at least one laser-formed hole therethrough. The plate is formed by positioning a plate preferably one having a thickness smaller than one and one-half milimeters alongside a laser and directing the laser beam so that it cuts a hole through the plate. During the process of producing the resistance, the value of the acoustic friction is measured as a pressure drop of a constant air stream or as an expenditure of electrical energy for an electrically excited electroacoustic transducer. This measurement is then used as a variable or as a standard for controlling the process. Advantageously, a coherent beam is emitted by the laser which is deflected by mirror from a horizontal to a vertical direction and focused by means of a lens to work in a contact-free manner on a workpiece supported on a support member such as a movable table. By moving the table in two coordinate directions, a plurality of bores are formed in a pattern in a workpiece. The workpiece may comprise a plate which may be rectangular, circular, annular, etc.

10 Claims, 12 Drawing Figures

FIG. 1
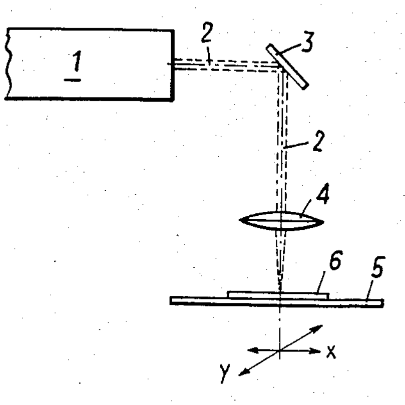
FIG. 2
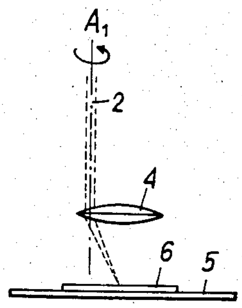
FIG. 4
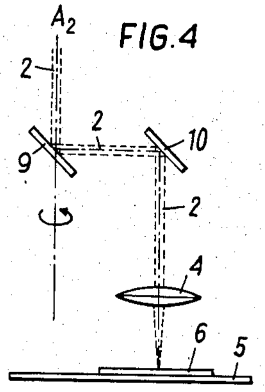
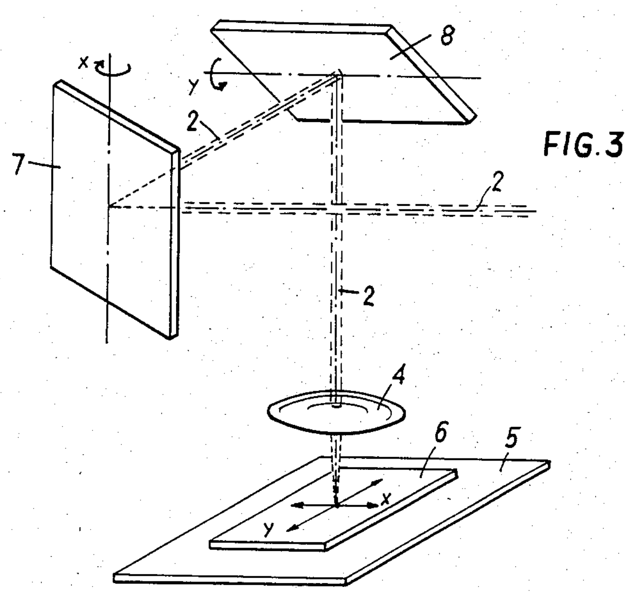
FIG. 3
FIG. 12
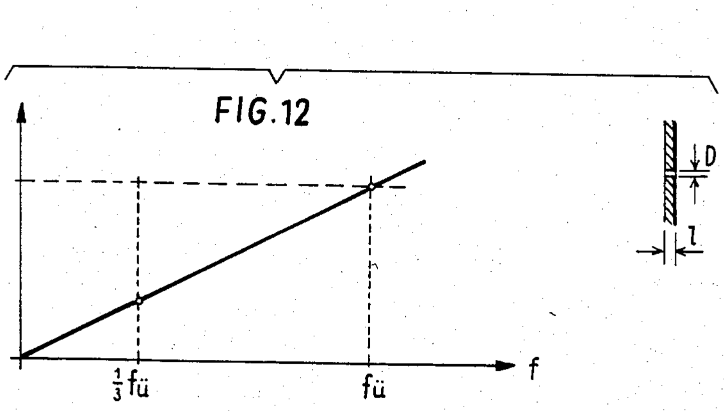

ACOUSTIC FRICTIONAL RESISTANCE CONSTRUCTION AND METHOD OF PRODUCING AN ACOUSTIC FRICTIONAL RESISTANCE USING A LASER

BACKGROUND OF THE INVENTION

1. Field of the Invention

The invention relates to a method in which a laser is employed for producing acoustic frictional resistances particularly as flat structures having a plurality of extremely narrow holes for passages of approximately cylindrical or conical shape, to be used in electroacoustic transducers.

From the publication "Acoustical Engineering" by H. Olson, Publisher Van Nostrand Co., 1957, page 89, it is known that a cylindrical bore having a radius r and length 1 has its acoustic impedance given by the formula:

$$Z_A = 8\frac{\mu}{\pi_r^4} 1 + jw\frac{4}{3}\,\frac{\rho}{\pi_r^2} 1,$$

with (air density)$\rho=1.25.10-3$ $gcm^{-3}$ and (air viscosity)$=1.86.0^{-4}$ $gcm^{-1}sec^{-1}$. For a conical bore with a small radius $r_1$, large radius $r_2$, and length 1, the formula reads:

$$Z_A = \frac{8}{3}\,\frac{\mu}{\pi r_1^3 r_2^3}(r_1^2 + r_1 r_2 + r_2^2)1 + jw\frac{4}{3}\,\frac{\rho}{r_1 r_2} 1.$$

These two formulas comprise a real term and an imaginary term which represent, respectively, the acoustic frictional resistance and the acoustic reactance formed by the air mass. While the acoustic frictional resistance is independent, the acoustic reactance depends linearly on the frequency and, in an equivalent electrical circuit, corresponds to an inductivity. The frequency at which the absolute values of the real and imaginary terms are equal to each other, is called transfer frequence fu which is given for a cylindrical bore by $$fu = \frac{3\mu}{\pi\rho}\,\frac{1}{r^2},$$

and for a conical bore by $$fu = \frac{\mu}{\pi\rho}\left(\frac{1}{r_1^2} + \frac{1}{r_1 r_2} + \frac{1}{r_2^2}\right)$$

At all frequencies exceeding fu, the reactant consisting of the acoustic mass is predominant; at frequencies which are lower or substantially lower than fu, the bore represents an impedance acting predominantly as an acoustic friction. Consequently, the efficiency of a bore as an acoustic frictional resistance depends, with a certain frequency range, on the diameter or the radius of the bore.

In Austrian Pat. No. 337,793, it is mentioned that in general, materials such as felt, non-woven fabric, tissues of various kinds, woven textiles, and even finely perforated metal foils are employed as acoustic frictional resistances. In the same disclosure, however, structural slots are also mentioned as means for producing acoustic friction, and the fabrication of an acoustic frictional resistance, preferably from a thermoplastic, in the shape of a flat structure with narrow passages is described, which are obtained by providing in the flat structure on both sides a plurality of depressions which partly extend over each other thereby producing sound passages at the overlapped locations.

It may also be provided, however, as does British Pat. No. 670,868 to combine two or more perforated plates with staggered perforations which cooperate with a very narrow air gap formed between the perforated plates, to damp the resonance peaks of a crystal microphone.

It is known from the technology of plastics that very narrow bores, having diameters of 0.5 mm and even less, can be produced with industrial lasers, primarily $CO_2$ lasers. See in this connection, number 2, 1975, of the periodical "Laser and Laser Optics".

Electroacoustic transducers, particularly high quality transducers to be used in studios, with hi-fi equipment and in the communication technology, are provided, in accordance with their destination and at certain locations, with acoustic frictional resistances. To mention only an example, the oscillating part of an electroacoustic transducer, namely the diaphragm, must be damped in its motion by means of such acoustic frictional resistances, to smooth particular resonance peaks and obtain a uniform frequency response over the transmission range.

The materials provided by the above mentioned Austrian Pat. No. 337,793 for acoustic frictional resistances, namely filter paper, open-pore foamed plastics, metal grids, and metal tissue, are manufactured also for other purposes, not specially as acoustic resistances. For example, felt is employed for hats, non-woven fabric for coating, foamed plastic material for packing, upholstering, and padding, and metal grids for purely technological purposes. Therefore, these materials have the disadvantage of having widely spread damping and frictional properties, or also, in view of the design of an acoustic frictional resistance in the median frequencies range, i.e. starting from 1,000 Hz, of being strongly affected by the acoustic mass. Either extensive and time consuming adjustments must then be provided, or the acoustic mass, acting as a reactance, must be taken into account in the design of the transducer, which may frequently lead to losses in the acoustic quality of the transducer. Another disadvantage of prior art acoustic resistances is that not all of them can be miniaturized as desired, which is at odds with a miniaturization of transducers.

SUMMARY OF THE INVENTION

The invention is therefore directed to materials and arrangements permitting the manufacture of electroacoustic transducers simply, economically and inexpensively, and capable of embodying a proper acoustic resistance, thus being usable purposefully. Quite by analogy to electrical component parts, an acoustic component part is provided which can be considered and used specifically as an acoustic frictional resistor or as an acoustic impedance having a predetermined fixed value and being secure against undesired disturbances and ambient conditions.

This component part is simple and inexpensive in manufacture to permit a production in great series and at narrow tolerances which do not require adjustment, and is of sufficiently small size to be usable in smallest transducers.

To this end, the invention provides an acoustic friction resistance for electroacoustic transducers, embodied by a preferably flat structural part having a thickness smaller than 1.5 mm, in which narrow cylindrical or conical holes are produced by means of a laser beam.

Using a laser has the advantage that holes or passages can be produced having diameters not exceeding 0.2 mm. The thickness of the flat structural parts may range between 0.1 mm and 1.5 mm. Since holes or bores of such small diameter cannot be produced by known mechanical processes, such as drilling or punching, nor in an injection technique for thermoplastics, a process must be employed permitting to make sufficiently small holes and thus to produce by means of holes and passages an acoustic friction which would be independent of the frequency within the range of 0 to 10 kHz.

A properly directed laser beam makes it possible to produce such narrow holes in the contact-free way. By absorption in the treated material, the radiated energy is converted to heat through which within a mininum space the material is caused to fuse, disassociate, evaporate, or even combust. By means of a laser beam, both plastics and metals can be drilled, while using wavelengths suitable for the material to be worked. For plastics and metal foils, $CO_2$ lasers are particularly suitable, emitting an electromagnetic radiation having a wavelength of 10.6 microns. The diameter of the produced bore is determined by the diameter of the focal point. With relatively thick materials, this spot must be moved, by means of suitable devices, from the surface into the interior of, and through, the mateiral.

The advantage of this method for producing acoustic impedances, particularly acoustic friction resistances, is the high working precision. In addition, materials can be employed which are necessarily transformed by the process to acoustic frictional resistances and can further be used only for electroacoustic transducers. Due to the extremely narrow manufacturing tolerances of this method, the degree of reproducibility is high. Primarily, the accurate control of the laser provided to preserve the exact emission properties of the laser, makes it possible to obtain definite, dependably reproducible bores. The configuration of the bores, for example cylindrical or conical, can also exactly be maintained. The bores themselves are burr-free, with smooth walls, so that no disturbing effects can be expected as the air flows therethrough.

According to a development of the invention, the method is further improved by measuring the value of the respective acoustic resistance and deriving therefrom a variable for controlling the process. This measurement may be done, for example, by taking the pressure drop occurring in a constant air stream at the acoustic resistance as a meausure of the friction resistance. The pressure drop at the resistance is the larger, the stronger the friction is. The pressure to be taken as variable for the control is measurable through a pressure pickoff. Another possibility is to measure the electric power supply to an excited electroacoustic transducer, such as a loudspeaker, and take it as the variable for controlling the manufacturing process. In this instance, the electroacoustic transducer is operated in its resonance region and is damped by the acoustic resistance to be produced. The resonance damping requires an additional electric power supply, as compared with a non-damped or only slightly damped operation of the transducer. This additional power needed for overcoming the acoustic damping is a measure of the acoustic frictional resistance.

This is how the acoustic properties of the frictional resistance can be influenced directly during the manufacture. Either the number of holes, or their diameter, or the value of the acoustic friction may be measured during the manufacture, and as far as advantageous, the process may be stopped upon reaching a predetermined value of the friction.

Accordingly, it is an object of the invention to provide an acoustic frictional resistance which comprises a plate which has at least one laser-formed hole therethrough.

A further object of the invention is to provide a method of forming a frictional resistance using a flat plate and using a laser which comprises positioning the plate adjacent the laser and focusing a laser beam so that it penetrates the plate and forms at least one hole therethrough.

A further object of the invention is to provide an improved acoustic resistance which is simple in design, rugged in construction and economical to manufacture.

For an understanding of the principles of the invention, reference is made to the following description of typical embodiments thereof as illustrated in the accompanying drawings.

BRIEF DESCRIPTION OF THE DRAWINGS

In the drawings:

FIG. 1 is a diagrammatical illustration of a device for carrying out the inventive method;

FIG. 2 is a sectional view showing the focusing and deflection of the laser beam by means of a rotating lens;

FIG. 3 is a perspective view showing the deflection of the focused laser beam by means of mirrors in mutually crossed positions;

FIG. 4 is a sectional view showing the deflection of a focused laser beam by means of a system comprising a lens and mirrors;

FIG. 12 is a diagram showing that the real part of the acoustic impedance of a hole or passage is independent of the frequency, and how the imaginary part thereof depends on the frequency.

GENERAL DESCRIPTION OF THE PREFERRED EMBODIMENTS

Figure 5:
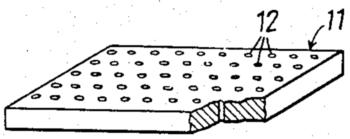
FIG. 5 is a perspective view of an inventive acoustic resistance embodied by a rectangular perforated plate.

Referring to the drawings, in particular, the invention embodied therein comprises an acoustic frictional resistance member in the form of a workpiece 6 which comprises a plate having at least one hole therethrough which is formed by a laser 1.

In accordance with the method of the invention, a frictional resistance is provided using a flat plate and a laser which comprises positioning the flat plate adjacent the laser and forming at least one hole through the plate by focusing the laser beam on the plate. During the process of producing the resistance for workpiece 6, the laser 1 is focused and the value of the acoustic friction is measured as a pressure drop of a constant air stream, or as an expenditure of electrical energy for an electrically excited electroacoustic transducer and this measurement is used as a variable or standard for controlling the process.

The diagrammatical illustration of FIG. 1 shows a coherent beam 2 emitted by a laser 1, which is deflected by a mirror 3 from a horizontal to vertical direction and focused by means of a lens 4 to work, in a contact-free manner, a workpiece 6 supported on a cross table 5. By moving table 5 in two coordinate directions, a plurality of bores in a provided pattern can be provided in workpiece 6.

If it is desired to make in this way bores along a circle, focused beam 2 may be moved relative to worpiece 6 by turning lens 4 about axis A, as indicated in FIG. 2.

FIG. 3 further shows that to produce the pattern of bores, laser beam 2 may be moved by means of 2 mirrors 7, 8 which are pivotable about axes x and y, respectively, which extend crosswise relative to each other.

The laser beam may also be moved by means of a lens-mirror system. For this purpose, as shown in FIG. 4, an optical system formed by a lens 4 and mirrors 9, 10 is moved about an axis A2. Such an arrangement will be of advantage if large circles of perforations are needed.

According to FIG. 5, the acoustic frictional resistance may take the shape of a perforated, preferably rectangular, plate 11. The perforations form a pattern of holes 12, arranged in rows perpendicular to each other. The plate may be metallic or of plastic and its thickness may range from a foil of some 100 microns, to 1.5 mm. Depending on the desired quality of the acoustic resistance, the individual holes of the pattern will have a diameter between 2 microns and 300 microns at most. The total number of holes in the pattern also depends on the quality to be obtained, and will vary between 100 and some thousands, per millimeter square. Depending on the operation of the laser and, thus, the local action of the radiant energy on the material, the holes will take an approximately cylindrical or conical shape. That is why a plate-shaped acoustic resistance is preferred, since a plate can be inserted, in the same way as an ohmic resistor into an electrical circuit, as a prefabricated component part having a definite fixed value, into corresponding recesses, apertures or openings provided in the electroacoustic transducer.

Figure 6:
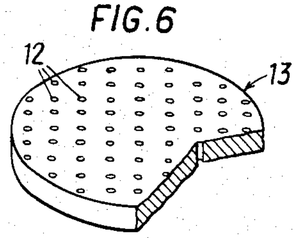
FIG. 6 is a similar view of an embodiment as circular perforated plate.
Figure 7:
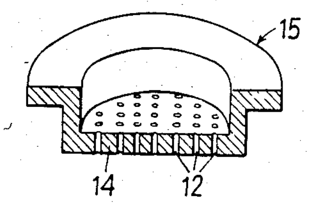
FIG. 7 shows a cup shaped embodiment.

The perforated plate may also take a circular shape as shown in FIG. 6, with the holes 12 forming a rectangular or concentric pattern. The plate may further be designed as a perforated disc 14 forming the bottom of a cup-shaped structure 15, as shown in FIG. 7 which, for better handling, forms an acoustical component part of the system of an electroacoustic transducer.

Figure 8:
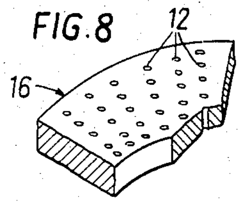
FIG. 8 shows an embodiment as an annulus.

FIG. 8 shows an inventive acoustic resistance embodied as a perforated annulus 16. This has the advantages of being a shape quite particularly well fitting the recesses and openings in an electroacoustic transducer which, in general, is designed as a cylindrical body including a diaphragm with a circular rim.

Figure 9:
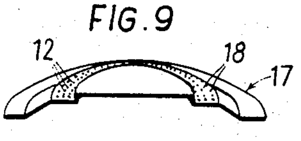
FIG. 9 shows an embodiment as a perforated circular portion of a shaped foil.

A development of the invention provides an embodiment shown in FIG. 9, in the form of a deep-drawn, shaped foil 17 of a thermoplastic having a thickness of some 100 microns and being perforated with a pattern of circle 18 or several concentric circles of holes 12.

Such an acoustic friction resistance may be conformed, for example, to the inner contour of a cover protecting the diaphragm of the transducer against mechanical damages, and at the same time acoustically damp the attachment which is effective as a Helmholz resonator, and act as an additional protection against soiling and mechanically damaging the diaphragm.

It is also possible, however, to provide the holes, effective as the acoustic frictional resistance, directly in the transducer body, at a proper location provided for this purpose.

Figure 10:
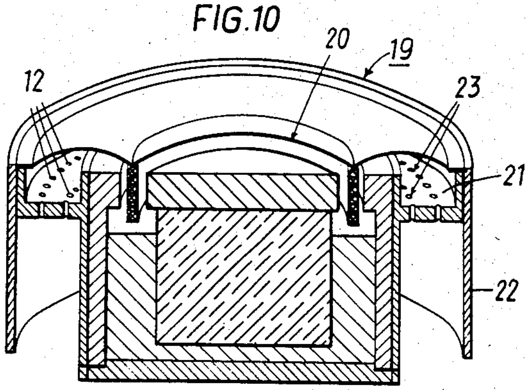
FIG. 10 shows how an inventive annular perforated plate is mounted in an electrodynamic transducer.
Figure 11:
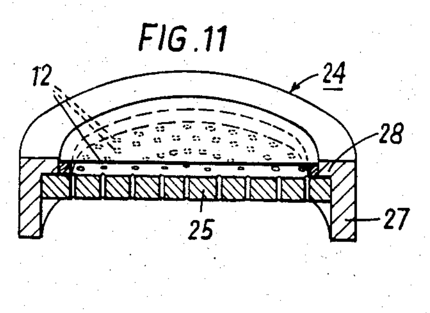
FIG. 11 shows an inventive circular plate mounted in an electrodynamic transducer.

Such an acoustic friction provided directly in the transducer body is shown in FIGS. 10 and 11. If an electrodynamic transducer 19 is concerned, one or more cirlces 23 of perforations which, as individual holes 12, are effective as acoustic frictions, are provided for this purpose in the circular part 21 of transducer body 22 extending beneath diaphragm 20. If an electrostatic transducer is concerned, the individual holes 12 are advantageously provided in the back plate 25 which is made of an electrically conducting plastic or coated with a conducting metal. The back plate is mostly backed up by a shoulder 28 provided for this purpose in transducer body 27.

The diagram of FIG. 12 shows how the real and the imaginary terms of an acoustic impedance produced by a cylindrical or conical bore or hole depend on the frequency. The value of the imaginary part is indicated by the solid line, the value of the real part by the broken line. While the real part, characterizing the acoustic friction, does not vary with the frequency, the imaginary part, characterizing the acoustic mass moved at the frequency in the passage having a diameter D and the length 1, rises linearly from 0. By transfer frequency fu, the frequency is understood at which the values of the real and the imaginary terms are equal to each other. Below the transfer frequency fu, the acoustic friction predominates, and up to a frequency of $\frac{1}{3}$ $f_u$ the impedance may be called an acoustic frictional resistance. To ensure the effect of the acoustic friction over an as broad a frequency as possible, for electroacoustic transducers operating in the audible region. This requires extremely narrow passages with diameters of some 10 microns up to 300 microns at most.

While specific embodiments of the invention have been shown and described in detail to illustrate the application of the principles of the invention, it will be understood that the invention may be embodied otherwise without departing from such principles.

What is claimed is:

1. An acoustic frictional resistance member for producing a selected known frequency independent acoustical impedance comprising a plate having a thickness of from 0.1 to 1.5 mm and at least one laser formed hole therethrough having a diameter of 0.3 mm at most.

2. A method of forming an acoustic frictional resistance member having a selected known frequency-independent acoustical impedance comprising providing a flat plate having a thickness of from 0.1 to 1.5 mm, and directing a laser beam at the plate to form a plurality of holes through the plate each having a diameter of 0.3 mm at most.

3. A method according to claim 2, wherein the laser beam is deflected before it is used to form a hole in the plate and wherein the plate is moved after the formation of each hole to position it in respect to the laser beam.

4. A method according to claim 3, wherein the plate is moved relative to the laser to form holes in the plate which is selected from a thin plate of rectangular, circular, or annular shape.

5. A method according to claim 2, wherein the flat plate comprises a transducer body and the plurality of holes are formed by the laser in said transducer body.

6. A method according to claim 5, wherein one or more concentric rows of holes are formed in said transducer body.

7. A method according to claim 2, including deflecting the laser beam by a different amount to move the laser beam to form each of the plurality of holes in the flat plate.

8. A method of forming an acoustic frictional resistance member having a selected known acoustical impedance comprising providing a flat plate having a thickness of from 0.1 to 1.5 mm, directing a laser beam at the plate to form a plurality of holes through the plate each having a diameter of 0.3 mm at most, supplying a constant air stream to the plate during the formation of the holes in the plate, measuring a pressure drop of the constant air stream at the plate, the pressure drop having the value corresponding to an instantaneous frictional resistance of the plate, comparing the instantaneous frictional resistance of the plate to a desired final frictional resistance of the plate, and stopping the formation of holes when the instantaneous frictional resistance meets the desired frictional resistance.

9. A method according to claim 8, including deflecting the laser beam by a different amount to move the laser beam to form each of the plurality of holes in the flat plate.

10. A method according to claim 9, including forming each hole to be cylindrical having a radius r, said flat plate having an acoustic frictional resistance with a transfer frequency fü which equals $fü=(3\mu/\pi\rho)(1/r^2)$

* * * * *